No. 698,833. Patented Apr. 29, 1902.
F. A. HARDY.
OPTOMETER.
(Application filed July 26, 1901.)
(No Model.)
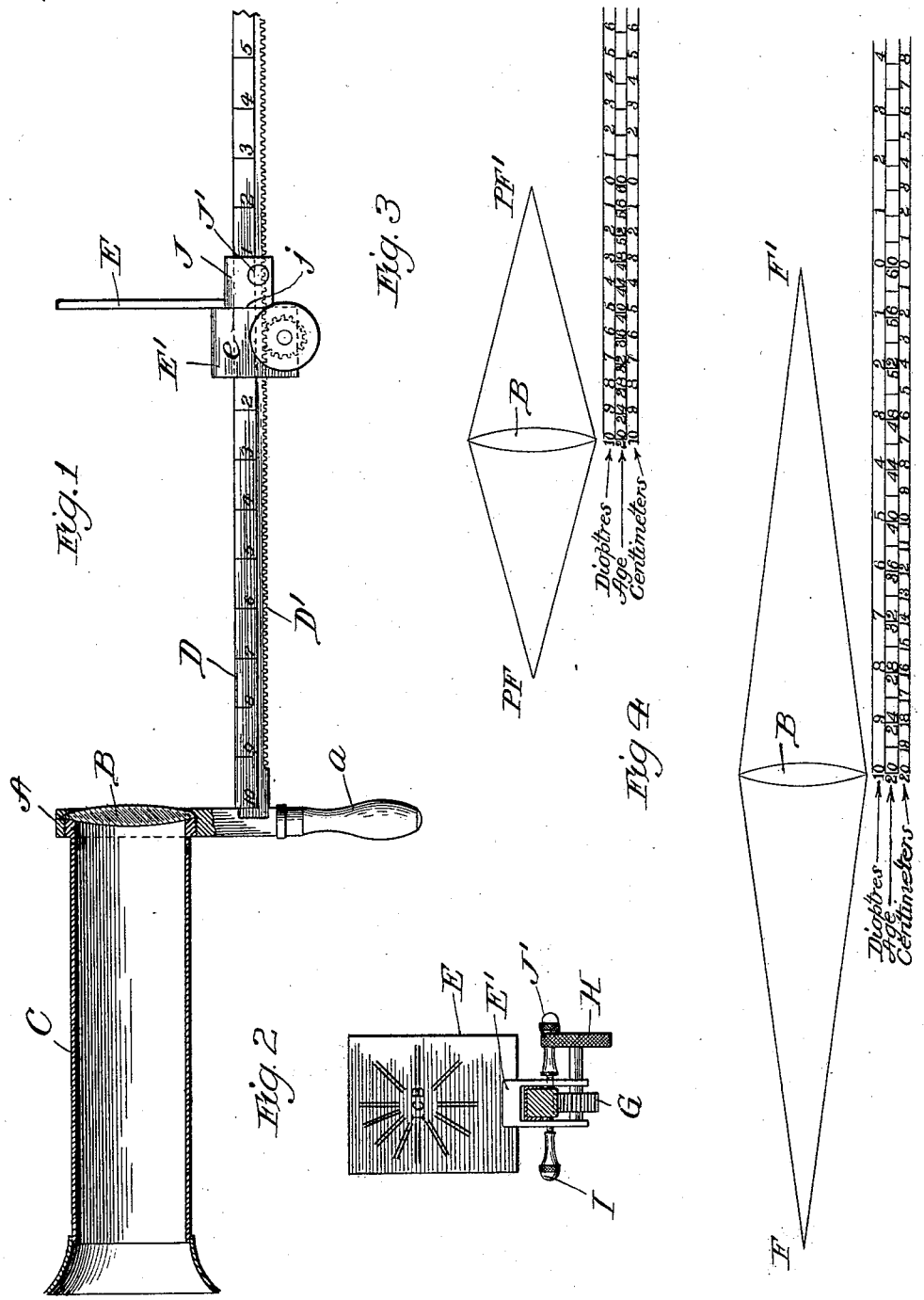
Witnesses:
Harold G Barrett
Edw. Barrett
Inventor
Francis A. Hardy
By Hopkins
Atty.

UNITED STATES PATENT OFFICE.

FRANCIS A. HARDY, OF EVANSTON, ILLINOIS.

OPTOMETER.

SPECIFICATION forming part of Letters Patent No. 698,833, dated April 29, 1902.

Application filed July 26, 1901. Serial No. 69,793. (No model.)

*To all whom it may concern:*

Be it known that I, FRANCIS A. HARDY, a citizen of the United States, residing at Evanston, in the county of Cook and State of Illinois, have invented certain new and useful Improvements in Optometers, of which the following is a specification.

The present invention relates to an instrument by means of which the range of accommodation, or, in other words, the interval between the punctum proximum and the punctum remotum, of the human eye may be accurately determined and plainly indicated upon a scale graduated in centimeters, diopters, or other notation appropriate to the art.

An optometer comprises a suitable frame, a lens mounted therein, an eyepiece adjacent to the lens, a bar carried by the frame and arranged parallel with the principal axis of the lens, and a target mounted to slide upon the bar, the bar being provided with a scale upon which the result of the test may be read.

Heretofore in the construction of optometers no particular attention has been paid to the relations of the refracting power or focal length of the lens and the length of the eyepiece. As a result of this the graduations of the scale have not been uniform; but, on the contrary, they have varied more or less irregularly.

Heretofore the instrument has never been provided with a scale so graduated as to show the range of accommodation, or, in other words, the punctum proximum and the punctum remotum, the interval between which is the range of accommodation, but has invariably been graduated to show the mean of the range of accommodation, and even this result is arrived at only through the ability of the patient to determine that position of the target, within the range of accommodation, at which it can be seen most clearly. Even a patient of high intelligence finds difficulty in determining this with certainty, and with a patient of low intelligence the result is not at all reliable. At best it involves more or less guesswork. In scientific practice this mean indication, even if accurate, is not all-sufficient, but, on the contrary, it is necessary to know with certainty the punctum proximum and the punctum remotum in order that the range of accommodation may be determined with equal certainty; and to provide an instrument by which this may be accomplished is one of the objects of the present invention.

Another of its objects is to provide an instrument by which the range of accommodation can not only be determined, but by which it is clearly indicated in diopters or in centimeters or other factors that can easily be reduced to units of refraction.

Another of its objects is to provide an instrument of the class described with two adjustable slides, one of which after finding one point may be fixed to the beam by a set-screw or other device in order to mark the point, while the other, carrying the target, may be moved upon the beam until the other point is found, the result being then read on a scale at the points indicated by the slides.

To these ends the invention consists in the features of novelty that are herein described.

In the accompanying drawings, which are made a part of this specification, Figure 1 is a sectional elevation of an optometer embodying the invention. Fig. 2 is a transverse section of the beam and a front elevation of the target mounted to slide on the beam. Figs. 3 and 4 are diagrams illustrating the principle which is to be followed in determining the relations of the lens to the eye of the patient and the graduations of the scale.

A represents a suitable frame, which is here shown as a ring having a handle $a$, by which the instrument may be held and supported by the patient.

B is a lens of known refracting power, secured in the frame.

C is a distance-piece (preferably in the form of a tube) carried by the frame, said distance-piece being of such length that when the eye is placed at the end of it or thereabout it (the eye) will be held at a point having a known and predetermined relation to the optical center and to the refracting power of the lens.

D is the graduated beam, carried by the frame and thereby supported parallel with the principal axis of the lens.

E is a target, the base E' of which is mounted to slide upon the beam.

G is a pinion, the shaft of which is journaled in the base of the target.

D' is a rack on the under side of the beam, with which the pinion meshes, and H is a thumb-wheel carried by a projecting end of the pinion-shaft.

It is manifest that by turning the pinion one way or the other the target may be slowly moved toward or from the lens, accordingly as the pinion is turned in one direction or the other. The rack and pinion has an advantage over a target which must be moved by direct pressure applied to it by the patient in that the movement of the target is gradual and not jerky, as it is apt to be when moved by direct pressure. When the target has been brought to the desired position on the beam, it may be there fixed by a set-screw I to prevent its accidental movement on the beam during subsequent manipulations of the instrument.

J is a slide mounted on the beam, and J' is a set-screw by which it may be fixed.

The base E' has a surface $e$ adjacent to the slide J, which falls in the plane of the face of the target proper, so that when the slide J is brought into contact with said surface $e$ its surface $j$ will mark the point on the beam corresponding with the face of the target. The slide may then be fixed in the position thus determined, and its face $j$ will indicate on the scale of the beam one factor in the test. The target may then be moved to find the other factor and then fixed by its set-screw.

Referring now to Fig. 3, let it be assumed that the lens B has a refracting power of ten diopters, and consequently has a focal length of ten centimeters, and that the length of the distance-piece is such that it holds the eyes at a distance of ten centimeters from the optical center of the lens, or, in other words, at its principal focus P F. The remaining principal focus P F' will of course be at the opposite side of the lens and at a distance of ten centimeters from its optical center. Let it be supposed also that the beam is graduated in centimeters and that one of the graduations falls opposite P F'. This graduation may be designated "0" and the other graduations may be numbered consecutively "1," "2," "3," &c., starting at the graduations next to "0" on its opposite sides and proceeding in both directions therefrom. These graduations according to the present system of numbering lenses will also represent diopters, and, if desired, one set of graduations, designated "centimeters," may be placed on one face of the beam, and another precisely similar set, designated "diopters," may be placed on another face of the beam. (The three faces of the beam are supposed to be shown diagrammatically in Figs. 3 and 4.)

With an instrument thus constructed if the target be placed at the outer end of the beam and then advanced toward the lens and stopped at the first point where the image can be clearly seen it will indicate on the scale the punctum remotum. The slide J may then be brought up to place and fixed to the beam by its set-screw to mark the point. If the target be then placed close to the lens and then moved away from it and stopped at the first point where the image can be clearly seen, it will indicate on the scale the punctum proximum, and the target may be fixed to the beam by its set-screw to mark this point. The exact range of accommodation may then be read in centimeters or in diopters, and in addition to this the relations of far and near points to the zero-point on the scale and to each other will indicate whether the eye is emmetropic or ammetropic and whether or not it has has the normal power of accommodation appropriate to the age of the patient.

I prefer to construct the instrument precisely in accordance with Fig. 3—i. e., with a ten-diopter lens, a distance-piece that will hold the eye at the principal focus P F of the lens, and a scale graduated in centimeters or diopters, or both, in both directions from a zero-point falling opposite the other principal focus P F' of the lens; but this is not essential, and any variation of these factors that does not alter their relations with each other, or, conversely, which will enable the use of a scale graduated to show units of refraction or other factors that can be readily reduced to units of refraction will be within the scope of the invention. Thus, as shown in Fig. 4, if without altering the lens the eye be placed at twenty centimeters from the optical center of the lens the conjugate foci will be at (F and F') opposite sides of the lens and at twenty centimeters from its optical center. The zero-point of the scale should then be placed opposite the focus F', and the scale may then be graduated, as before, in centimeters and diopters. The only difference will be that the graduations representing diopters will be two centimeters apart instead of one, as is the case where the eye and the zero-point of the scale are placed at the principal foci of the lens. In like manner the scale may be graduated for a lens of any power or for any known distance between the eye and the optical center of the lens; but these factors should always be of values that will enable the use of a scale graduated in diopters or some other factor that may be easily reduced to units of refraction.

If desired, the beam may have a third scale, graduated to show the age which corresponds to the ascertained range of accommodation.

What I claim as new, and desire to secure by Letters Patent, is—

1. An optometer having, in combination, a lens, a distance-piece, a graduated beam, a target mounted to slide upon the beam, a slide also mounted to slide upon the beam, and controllable means for fixing the slide on the beam, said slide having a surface adapted to indicate upon the beam the graduation corresponding with the face of the target, substantially as described.

2. An optometer having, in combination, a lens, a distance-piece, a graduated beam, a target mounted to slide upon the beam, and a slide also mounted upon the beam, said slide having a surface adapted to be brought to the plane of the face of the target, substantially as described.

3. An optometer having, in combination, a lens of known refracting power, a distance-piece for holding the eye at one principal focus of the lens, a beam graduated to show units of refraction of said lens and with its zero-point at the other principal focus of the lens, a target mounted to slide on said beam, and a slide also mounted on the beam, said slide having means for indicating upon the beam the graduation corresponding with the face of the target, substantially as described.

4. An optometer having, in combination, a lens of known refracting power, a distance-piece equal to the focal length of the lens, a beam graduated to show units of refraction, the graduation falling opposite the principal focus of the lens being marked zero (0) and the other graduations being numbered in both directions from zero, a target mounted to slide on the beam, and a slide also mounted on the beam, said slide having means for indicating upon the beam the graduation corresponding with the face of the target, substantially as described.

FRANCIS A. HARDY.

Witnesses:
JOHN H. HARDIN,
L. M. HOPKINS.